Oct. 6, 1931.  C. R. LEITER  1,825,876
STUD SETTER
Filed Aug. 18, 1930
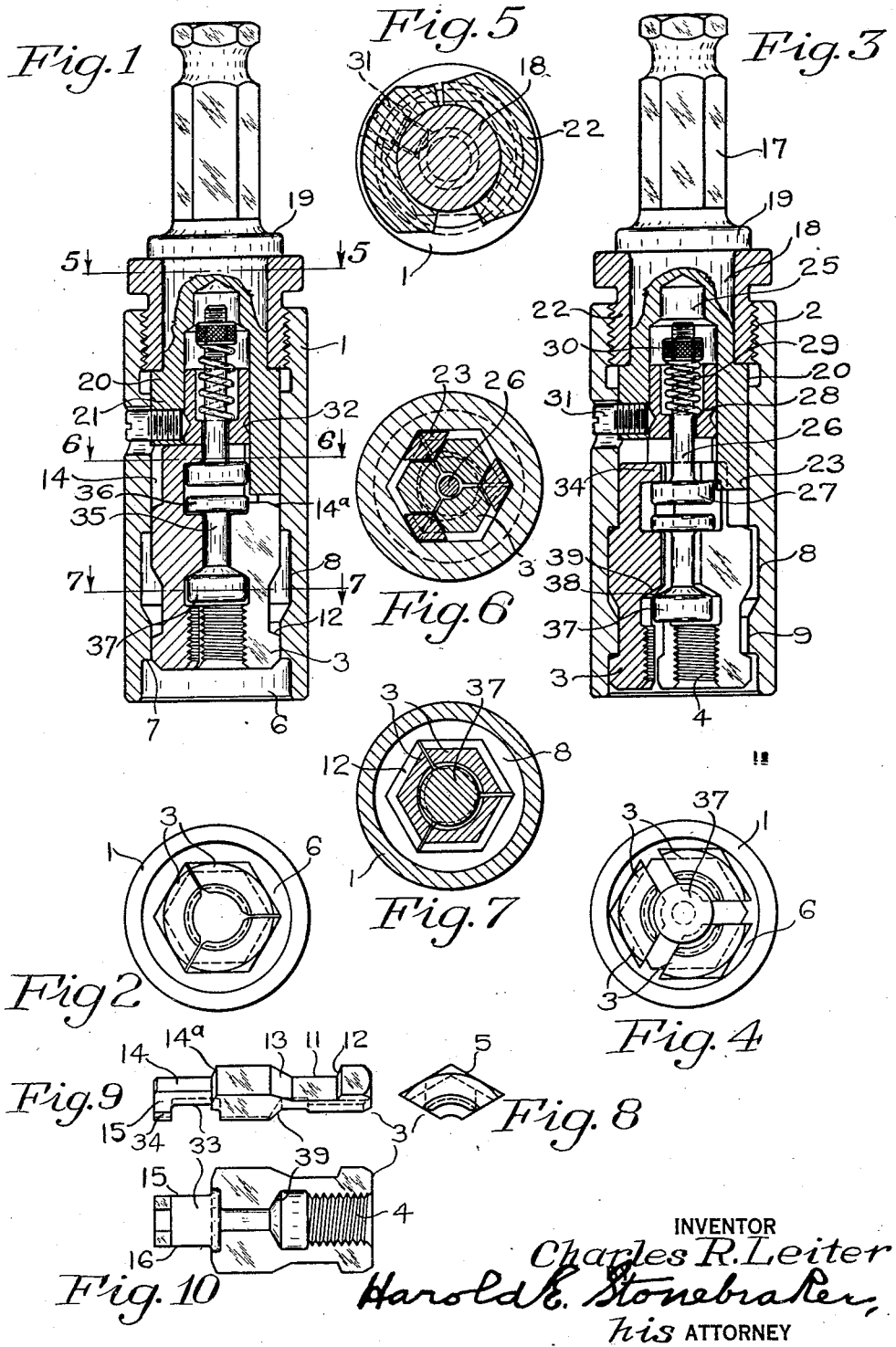
INVENTOR
Charles R. Leiter
Harold E. Stonebraker,
his ATTORNEY Patented Oct. 6, 1931

1,825,876

UNITED STATES PATENT OFFICE

CHARLES R. LEITER, OF ROCHESTER, NEW YORK, ASSIGNOR TO CONSOLIDATED MACHINE TOOL CORPORATION OF AMERICA, OF ROCHESTER, NEW YORK, A CORPORATION OF DELAWARE

STUD SETTER

Application filed August 18, 1930. Serial No. 476,080.

This invention relates to improvements in stud setters of the kind used in setting threaded studs in tapped openings.

The principal object of the invention is to provide a stud setter of this kind which is simple in construction, easy to make and assemble, strong and automatic in action.

Another object of the invention is to provide a stud setter of this kind in which the jaws are held in the body portion by a single means, permitting them to be quickly removed and replaced, thus making the jaws interchangeable for operating on studs of different sizes.

Still another object of the invention is to provide a stud setter in which the jaws are firmly held in engagement with the stud by means which engages them at or adjacent the point where they engage the stud, thus insuring engagement with the stud at all times when the jaws are in the operative or closed position.

A still further object of the invention is to provide means which positively engages the jaws at the point where they engage the stud for turning them, thus relieving them of all strain which might tend to distort them when setting a large heavy stud.

To these and other ends, the invention consists in the construction and arrangement of parts that will appear from the following description when read in conjunction with the accompanying drawings, the novel features being pointed out in the claims at the end of the specification.

In the drawings:

Fig. 1 is a longitudinal section partly broken away of a stud setter illustrating one possible embodiment of the invention, the jaws being shown in closed or operative position;

Fig. 2 is an inverted plan view of the same;

Fig. 3 is a view similar to Fig. 1 showing the jaws in expanded or open position;

Fig. 4 is a view similar to Fig. 2 showing the jaws in expanded position;

Fig. 5 is a section taken substantially on line 5—5 of Fig. 1 and looking in the direction of the arrows at said line;

Fig. 6 is a section taken substantially on line 6—6 of Fig. 1 and looking in the direction of the arrows at said line;

Fig. 7 is a section taken substantially on line 7—7 of Fig. 1 looking in the direction of the arrows at said line;

Fig. 8 is a lower end view of one of the jaws detached;

Fig. 9 is a side view of the same, and

Figure 10 is an inside view of the same.

Referring particularly to the drawings, in which like reference numerals refer to the same parts in all the figures, 1 represents a body portion or casing in which the parts of the stud setter are mounted. The casing is of hollow cylindrical form having an opening longitudinally therethrough of substantially polygonal or hexagonal form throughout the greater part of its length. The opening at the upper end of the casing is cylindrical and internally threaded at 2 for a purpose which will presently appear.

Slidably mounted in the body portion or casing adjacent its lower end are a plurality of jaws 3, three jaws being shown in the present instance, although it will be understood that a greater or lesser number may be used without departing from the spirit or scope of the invention. Each of these jaws 3 is screw-threaded at its inner side adjacent its end as at 4, and cooperates with the adjacent jaws to form a continuously threaded internal opening adapted to cooperate with the externally threaded end of a stud to be set. Externally adjacent its lower end and opposite the threaded portion each of the jaws is provided with an angular portion or lug 5, see Fig. 8, which is adapted to cooperate with the hexagonal inner opening in the casing, which they engage when in the closed position shown in Fig. 1. The jaws are of such a size that when retracted within the opening, as seen in Fig. 1, their side edges lie substantially in contact with each other and rotative movements applied to the casing will be transmitted to the jaws as a unit. It will be noted that the jaws are arranged between the stud and the casing and that the rotative force applied by the latter does not tend to twist or distort the jaws, as is the case when the rotative force is applied at some other point.

The opening in the casing is enlarged at 6 and the inner wall of this enlarged portion is circular or cylindrical, a shoulder 7 being formed at its upper end. Spaced upwardly from the enlarged portion 6 of the opening in the casing, said opening has a second enlarged portion 8 also having a cylindrical inner wall. At its lower end the wall of the enlarged portion 8 inclines inwardly toward the restricted portion 9 arranged between the enlarged portions 6 and 8 and having a polygonal or hexagonal inner wall.

The outer faces of each of the jaws 3 have cut-out portions 11 spaced from but adjacent the lower ends thereof. The cut-out portions 11 have outwardly and downwardly inclined walls or surfaces 12 at their lower ends and upwardly and outwardly inclined walls 13 at their upper ends. At their upper ends the jaws are again cut away on their outer faces at 14 and their side edges or corners are also cut away longitudinally at 15 and 16 to form substantially parallel side walls for a purpose to be presently explained. The lower ends of the cut-away portions 14 have downwardly and outwardly inclined walls formed thereon, as indicated at 14ª in the drawings.

The casing 1 and the parts mounted therein are carried on a shank 17 of angular formation to be attached to a suitable tool by which it may be rotated. The shank is provided with an enlarged lower end having a cylindrical portion 18 having an outwardly projecting flange 19 at its upper end and an outwardly projecting wall 20 at its lower end formed by an enlarged polygonal or hexagonal portion 21 on the shank which engages the inner hexagonal wall of the casing and prevents relative rotation between the shank and casing. A split thimble, sleeve or collar 22 is arranged on the cylindrical portion 18 and is provided with external threads which cooperate with the internal threads 2 in the upper end of the casing. By this arrangement the casing is adjustably mounted on the shank, since by turning the split sleeve in one direction the shank and casing are moved toward each other and by turning it in the reverse direction they are moved away from each other. The parts of the split sleeve do not entirely surround the part 18 so that one or the other may be moved independently to lock the casing to the shank, as shown in Fig. 5.

Projecting downwardly from the part 21 are a plurality of fingers 23 arranged in alternate inner angles of the hexagonal opening in the casing. Each of these fingers is quadrangular in cross-section, having two sides and an angle arranged in contact with the inner wall of the casing and two sides arranged in contact with the adjacent sides 15 and 16 of two of the jaws 3, see Fig. 6. In the present instance, three of the fingers 23 are shown, one arranged between each pair of adjacent jaws and serve to guide the jaws in their movements longitudinally or radially of the casing.

The lower end of the shank is counterbored, as shown, to provide an opening 25 in which a spring-actuated bolt or rod 26 is mounted and which serves as a retaining member for the jaws. The bolt 26 is provided with an enlarged head 27 at its lower end and passes upwardly through an opening in a cup-shaped member 28 secured in the opening in the shank. A spring 29 is coiled about the bolt 26 and engages the bottom of the cup-shaped member at one end and at its other end engages a nut 30 threaded on the upper end of the bolt, and which may also serve to vary the tension of the spring. A set screw 31 is arranged in a slot or elongated opening in the casing and threaded in an opening in the shank, and at its inner end engages a groove 32 in the outer wall of the cup-shaped member 28. By this construction, the cup-shaped member is disengageably secured in the shank. The inner faces of the jaws are cut away at 33 adjacent their upper ends to form inwardly projecting lugs 34 at their upper ends which are adapted to overlie and engage the upper side of the head 27. Mounted on the inwardly projecting walls at the lower ends of said cut-away portions 33 is a button 35 having an enlarged head 36 having a downwardly extending shank arranged in a central opening between the jaws which terminates in a second enlarged head 37 arranged in an opening formed in the jaws immediately above the threaded portions thereof, as seen in the drawings. The upper face of the head 37 tapers downwardly and outwardly, as seen at 38, and cooperates with similarly formed surfaces 39 on the jaws.

It will be noted that by disengaging the set screw 31 from the cup-shaped member 28 said member is released from the shank and is free to move downwardly from the shank, the bolt 26, the jaws, and connected parts moving therewith from the casing. The jaws may then be removed and replaced by a new set adapted to operate a larger or smaller stud. The unit with the new jaws may then be reinserted in the casing and moved upwardly until the groove in the cup-shaped member again registers with the inner end of the set screw, which may then be turned inwardly into reengagement therewith. It will be noted that this construction provides a simple device comprising but a single means for retaining the jaws in position in the casing which is readily released for replacing the jaws with another set. By inserting the set screw in an elongated opening in the casing, it does not interfere with the relative adjustment between the shank and the casing by means of the split thimble 22.

The operation is as follows: Assuming the parts to be in the position shown in Fig. 3, with the jaws expanded to the open position, the tool is rotated by any suitable means and engaged with a stud seated in the top of a tapped opening in a casting. The jaws are retained in the position shown against the tension of the spring 29 by the interengagement of the jaws with the shoulder 7 in the casing and the inwardly projecting portion at the upper end of the enlarged portion 8. The threads of the jaws may loosely engage the threads of the stud, and the stud setter moves bodily toward the casting while the jaws move over the stud until the stud engages the lower end of the button 35 and tends to raise it and with it the jaws in co-operation with the action of the spring 29. The inclined surfaces 12 and 14ª on the jaws engage the inner wall of the casing which cams the jaws inwardly until freed from the casing when they move upwardly under the action of the stud and the spring 29 to the Fig. 1 position, in which the jaws firmly grip the stud and turn it into the tapped opening until the lower end of the casing engages the casting. At this time, the further rotation or driving of the stud moves the jaws downward in the casing against the action of the spring 29 until the projecting parts 3 of the jaws snap into the enlarged opening 6 at the bottom of the casing and release the stud from driving engagement therewith.

Referring to the drawings, it will be noted that adjustment of the casing on the shank varies the depth to which the stud is set. If the split stud 22 is screwed into the casing from the Fig. 1 position, the lower ends of the jaws are adjusted toward the lower end of the casing to shorten the driving distance, while adjustment in the reverse direction lengthens the driving distance.

Although only one embodiment of the invention is shown and described herein, it will be understood that this application is intended to cover such changes or modifications as come within the spirit of the invention or scope of the following claims.

I claim:

1. In a stud setter, the combination with a revoluble shank, of a hollow casing mounted thereon, a plurality of separate jaws movably mounted in said casing and adapted to engage and turn a stud to be set in a work piece, the jaws being moved relatively to the casing by the stud to a position to disengage the stud when the casing engages the work piece, and means arranged between the hollow casing and the shank for adjusting the casing thereon to vary the relative position of the jaws in the casing and the depth to which the stud is set when the jaws are moved to disengage the same.

2. In a stud setter, the combination of a revoluble shank, a hollow casing threaded at one end, a threaded thimble revoluble on the shank and adapted to engage the threaded end of the casing to adjustably secure the casing to the shank, a plurality of jaws movably mounted in said casing and adapted to engage and turn a stud to be set in a work piece, the construction being such that the jaws are moved relatively to the casing to disengage the stud when the casing engages the work piece, and means on the shank for limiting the movement of the jaws, the position of said limiting means being determined by the relative adjustment of the casing on the shank.

3. In a stud setter, the combination of a revoluble shank, a hollow casing threaded at one end, a two-part thimble revolubly engaging the shank and threaded into the threaded end of the casing for adjustably securing the casing to the shank and locking it in adjusted position, a plurality of jaws movably mounted in said casing and adapted to engage and turn a stud to be set in a work piece, the construction being such that the jaws are moved relatively to the casing to disengage the stud when the casing engages the work piece, and a stop on the shank for limiting the movement of the jaws, the position of said stop being determined by the relative adjustment of the casing on the shank.

4. In a stud setter, the combination of a shank, a hollow casing mounted on the shank, a plurality of separate jaws movably mounted in the casing and adapted to engage and turn a stud to be set in a work piece, a movable member to which said jaws are connected, and a single means for connecting said movable member to the shank and retaining the jaws in the casing.

5. In a stud setter, the combination of a shank, a hollow casing mounted on the shank, a plurality of jaws movably mounted in the casing and adapted to engage and turn a stud to be set in a work piece, a retaining member arranged in the shank, a device movably mounted in said retaining member and operatively engaging said jaws, and a single means arranged in an opening in the casing for securing said retaining member in the shank.

6. In a stud setter, the combination of a shank, a hollow casing mounted on the shank, a plurality of jaws movably mounted in the casing and adapted to engage and turn a stud to be set in a work piece, a retaining device movably mounted in the shank and operatively engaging the jaws for retaining them in the casing, resilient means engaging the retaining device for moving the jaws toward the shank, and means on the shank for guiding and limiting the movement of the jaws.

7. In a stud setter, the combination of a revoluble shank, an elongated casing having an angular-shaped opening therethrough secured on the shank to rotate therewith, a plurality of jaws arranged in the angles of said opening and movable therein to engage and turn a stud to be set in a work piece, resilient means for moving the jaws longitudinally of the casing, interengaging means on the jaws and the casing for retaining the jaws against the action of said resilient means, and means for camming the jaws into turning engagement with a stud when moved under the action of said resilient means.

8. In a stud setter, the combination of a revoluble shank, an elongated casing having an angular-shaped opening therethrough secured on the shank to rotate therewith, a plurality of jaws arranged in the angles of said opening and movable therein to engage and turn a stud to be set in a work piece, resilient means for moving the jaws longitudinally of the casing, threads on the inner faces of the jaws adjacent their operative ends for engaging a stud, angular lugs on the jaws opposite the threaded portions thereof adapted to engage the angular opening in the casing to be rotated thereby when the jaws are in operative position but movable into an enlarged portion of said opening when the jaws are moved to inoperative position, and means for camming the jaws into turning engagement with a stud when moved under the action of said resilient means.

9. In a stud setter, the combination of a revoluble shank, a hollow casing mounted thereon, a plurality of jaws movable in said casing to engage and turn a stud to be set in a work piece, a movable member operatively engaging the jaws and operable to move them longitudinally in the casing to operative position, a spring for actuating said member, and adjustable means for controlling the tension of said spring.

In witness whereof, I have hereunto signed my name.

CHARLES R. LEITER.